United States Patent [19]

Matsui et al.

[11] Patent Number: 5,202,867
[45] Date of Patent: Apr. 13, 1993

[54] CONDENSING OPTICAL SYSTEM WITH CORRECTED CHROMATIC ABERRATION, AND INFORMATION RECORDING/REPRODUCING APPARATUS USING THIS OPTICAL SYSTEM

[75] Inventors: Hiroshi Matsui; Osamu Koyama, both of Kawasaki, Japan

[73] Assignee: Canon Kabushiki Kaisha, Tokyo, Japan

[21] Appl. No.: 702,156

[22] Filed: May 15, 1991

Related U.S. Application Data

[63] Continuation of Ser. No. 149,090, Jan. 27, 1988, abandoned.

[30] Foreign Application Priority Data

Jan. 29, 1987 [JP] Japan ................ 62-020010

[51] Int. Cl.$^5$ ............................. G11B 7/09
[52] U.S. Cl. ................. 369/44.230; 359/795; 369/112
[58] Field of Search ............... 350/6.3, 502, 247, 255, 350/413, 432, 438, 481; 369/44.11, 44.23, 112; 250/201.1, 201.5; 359/210, 363, 813, 823, 652, 708, 722, 795

[56] References Cited

U.S. PATENT DOCUMENTS

| | | | |
|---|---|---|---|
| 1,352,028 | 9/1920 | Ross | 350/481 |
| 2,417,330 | 3/1947 | Strang | 350/481 |
| 2,559,844 | 7/1951 | Bennett | 350/481 X |
| 3,441,338 | 4/1969 | Johnson et al. | 350/481 X |
| 3,511,558 | 5/1970 | Uberhagen | 350/481 |
| 4,610,515 | 9/1986 | Tanaka | 369/112 X |
| 4,657,352 | 4/1987 | Suda et al. | 350/432 |
| 4,725,721 | 2/1988 | Nakamura et al. | 369/45 X |
| 4,729,645 | 3/1988 | Suda | 350/432 |
| 4,748,321 | 5/1988 | Ishida et al. | 250/201 |
| 4,755,039 | 7/1988 | Hattori | 350/481 X |
| 4,770,506 | 9/1988 | Baba | 350/413 |
| 4,778,984 | 10/1988 | Nakamura | 250/201 |
| 4,782,239 | 11/1988 | Hirose et al. | 250/201 X |
| 4,807,212 | 2/1989 | Kaneda et al. | 250/201 X |
| 4,815,059 | 3/1989 | Nakayama et al. | 369/112 X |
| 4,828,373 | 5/1989 | Suda et al. | 350/432 |
| 4,905,214 | 2/1990 | Nagashima | 369/112 X |

FOREIGN PATENT DOCUMENTS 61-3110 1/1986 Japan.

OTHER PUBLICATIONS

Yoshiya Matsui Lens Design (Kyoritsu Publishing Co., 1972), pp. 114–117.

*Primary Examiner*—W. R. Young
*Attorney, Agent, or Firm*—Fitzpatrick, Cella, Harper & Scinto

[57] ABSTRACT

A condensing optical system for condensing light from a record medium onto a photodetector in such as an optical information recording/reproducing system, comprises a first lens group and a second lens group, and these first and second lens groups cooperate to correct aberrations, especially a chromatic aberration, in the system with respect to plural wavelengths of lights esp. by making Abbe's numbers of those first and second lens groups different from each other.

13 Claims, 2 Drawing Sheets

CONDENSING OPTICAL SYSTEM WITH CORRECTED CHROMATIC ABERRATION, AND INFORMATION RECORDING/REPRODUCING APPARATUS USING THIS OPTICAL SYSTEM

This application is a continuation of application Ser. No. 07/149,090 filed Jan. 27, 1988, now abandoned.

BACKGROUND OF THE INVENTION

The present invention relates to a condensing optical system for condensing light reflected by a surface of an information recording medium onto a photodetector when information is recorded on the surface of the information recording medium or when the information recorded on the surface of the medium is reproduced, and an information recording/reproducing apparatus comprising this condensing optical system.

In order to perform an optical recording or optical write access to an information recording medium, a beam spot modulated by information is applied on a surface of the medium to change optical characteristics of the medium, or reflected light is detected, which is modulated in accordance with the information recorded on the surface of the medium.

In order to achieve high-density information recording, 1-μm pits are aligned at high density along each track (track width: about 1.6 μm) on a surface of a medium such as an optical disk. Therefore, unless a light beam emitted from a light source such as a semiconductor laser is focused on the surface of the medium by a predetermined focusing lens, with having almost no aberration, accurate information recording/reproduction can hardly be achieved. In order to focus a beam spot at a desired position, even if a disturbance such as surface vibration upon rotation of an optical disk occurs, AF (auto focusing) and AT (auto tracking) must be performed and hence an actuator which can accurately drive an objective lens and a servo system for controlling the drive control of the actuator must be arranged.

An optical system used in an apparatus of this type is constituted by an objective lens system for forming a beam spot on the surface of a medium, and a lens system for condensing light onto a photodetector which is used for detecting information recorded on the medium and for detecting a servo signal for AF and AT control.

In the conventional objective lens system and the condensing lens system, aberrations are corrected well only with respect to a single oscillation wavelength inherent to a semiconductor laser serving as a light source.

However, when an ambient temperature changes or an output from the semiconductor laser changes, a wavelength of the laser beam emitted from the semiconductor laser is considerably changed. For this reason, changes in aberration (generation of aberrations) occur in the lens systems, and accurate information recording or reproduction cannot be peformed.

Japanese Patent Laid-Open No. 3110/1986 discloses a technique wherein an achromatic lens is used in the objective lens system. However, the achromatic lens is merely designed such that light beams of two different wavelengths are focused at an identical position. Therefore, again, this technique cannot prevent an adverse influence on a servo detection system caused by changes in aberration in the condensing optical system due to fluctuations in wavelength.

In the conventional information recording/reproducing apparatus, servo control for AF and AT is unstable due to variations in wavelength. As a result, accurate information recording and reproduction have not yet been realized.

SUMMARY OF THE INVENTION

It is an object of the present invention to provide a condensing optical system which is free from the conventional drawbacks, and can accurately condense light reflected by an information recording medium onto a photodetector regardless of variations in wavelength.

It is another object of the present invention to provide an information recording/reproducing apparatus capable of accurate information recording and reproduction.

In order to achieve the above objects, a condensing optical system of the present invention is an optical system for condensing or focusing light reflected by an information recording medium onto a photodetector, and comprises a plurality of lens groups having different Abbe's numbers so as to perform aberration corrections with respect to a plurality of wavelengths.

An information recording/reproducing apparatus of the present invention has a semiconductor laser, an objective lens system for focusing light emitted from the laser onto an information recording medium, and a detection optical system for receiving light reflected by the medium and transmitted through the objective lens system and focusing the reflected light onto a photodetector. The optical system comprises a plurality of lenses having different Abbe's numbers, and is aberration-corrected with respect to a plurality of wavelengths.

More specifically, in the focusing or detection optical system, materials of lens groups are set such that the Abbe's numbers of first and second lens groups of the plurality of lens groups (lenses) are different from each other, and the lenses are designed to minimize aberrations occurring in the entire system with respect to a plurality of wavelengths.

When each lens group is constituted by a plurality of lenses, a refracting power $\psi$ of each lens group is represented by a composite reflective power of the lenses, and the Abbe's number $\nu$ of each lens group can be regarded as a composite (average) Abbe's number of the Abbe's numbers of the lenses. In the following description, each lens group is regarded as a single lens.

The detailed aspects and other features of the present invention will be described in detail in the following embodiments.

DETAILED DESCRIPTION OF THE PREFERRED EMBODIMENTS

Figure 1:
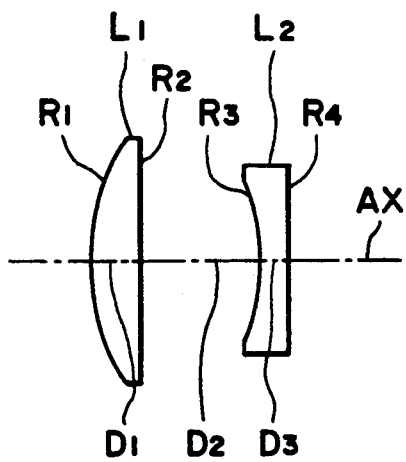
FIGS. 1 and 2 are respectively a sectional view of a lens and a view showing aberrations in a focusing optical system according to a first embodiment of the present invention.

In a semiconductor laser which is normally used as a light source in an optical information recording/reproducing apparatus, an oscillation wavelength is varied due to a change in temperature. In an optical information recording/reproducing apparatus in which such as an optomagnetic disk apparatus or a phase-change type after-write disk is used and which requires a plurality of modes, e.g., recording, reproducing, and erase modes, variations in wavelength due to a change in output from the semiconductor laser upon switching the modes occur.

According to the present invention, a condensing or focusing optical system for guiding light obtained from a surface of a medium through an objective lens toward a photodetector is constituted by first and second lens groups arranged from the side of the surface of the medium. The first lens group comprises a lens having a positive refracting power and the second lens group comprises a lens having a negative refracting power. These lenses have different Abbe's numbers.

In order to minimize a change in focal point of a light beam incident on a photodetector, i.e., a change in chromatic aberration when a wavelength of a light source changes, assume that the first lens group comprises a single convex lens and the second lens group comprises a single concave lens. In this case, if the Abbe's number of the single convex lens is given by $\nu_p$, and that of the single concave lens is given by $\nu_n$, the entire lens system need only satisfy the following relationship:

$$\nu_p > 60, \; 35 > \nu_n \tag{1}$$

Assuming that a third-order on-axis chromatic aberration coefficient is given by L, a refracting power of the single convex lens is given by $\psi_p$, where $\psi_p = 1/(f_p/F) = F/f_p$, the focal length of the first group positive lens being $f_p$, and the focal length of the total condensing optical system being F and a refracting power of the single concave lens is given by $\psi_n$, where $\psi_n = 1/(f_n/F) = F/f_n$, the focal length of the second group negative lens being $f_n$, and the focal length of the total condensing optical system being F if the lenses have small thicknesses, the coefficient L is represented by:

$$L = h_p \frac{\psi_p}{\nu_p} h_n \frac{\psi_n}{\nu_n}$$

("Lens Design" written by Yoshiya Matsui, published by Kyoritsu Publishing Co.) where $h_p$ and $h_n$ are respectively paraxial ray incident heights. If the coefficient L is reduced, the on-axis chromatic aberration can be corrected well. For this purpose, if the following condition is satisfied:

$$-0.15F < \frac{\psi_p}{\nu_p} + \frac{\psi_n}{\nu_n} < 0 \tag{2}$$

a focusing optical system, in which the chromatic aberration is well corrected, can be realized. In this condition, F represents a focal length of the focusing optical system.

In order to render a recording/reproducing apparatus resistant against the variations in wavelength described above, a paraxial lateral magnification of the optical system extending from the surface of the medium to the photodetector must be increased. More specifically, a focal length of a condensing or focusing optical system for focusing, onto the photodetector, light obtained through the objective lens must be set as long as possible with respect to a focal length of the objective lens for forming a beam spot on the surface of the medium. According to the optical system of the present invention, the focusing optical system is preferably constituted by a telescopic system consisting of the first lens group having the positive refracting power and the second lens group having the negative refracting power. With this arrangement, the entire system can be rendered compact, and the paraxial lateral magnification can be increased.

An embodiment of the present invention will be described hereinafter.

Tables 1, 2, and 3 respectively show first, second, and third embodiments of a focusing optical system of the present invention.

In Tables, Ri (i=1, 2, 3, 4) is a radius of curvature of an ith surface numbered from the surface of the medium, Di (i=1, 2, 3) is an axial interval between the ith and (i+1)th surfaces numbered from the surface of the medium, Ni (i=1, 2) is a refracting power of an ith lens numbered from the surface of the medium at a wavelength $\lambda = 820$ nm, $\nu_i$ (i=1, 2) is an Abbe's number of the ith lens, F is a focal length of the entire system (in this invention, F=1.0), and FNO is an f-number.

A curvature of the surface on the side of the medium of each of a first lens near the medium and a second lens near a photodetector is set to be larger than that of the surface on the side of the photodetector. The first lens comprises a bi-convex positive lens, and the second lens comprises a concave meniscus lens which has a concave surface facing the side of the medium. The first and second lenses respectively correspond to $L_1$ and $L_2$ shown in FIG. 1 (to be described later).

TABLE 1

| F = 1.0 | | FNO = 6.5 | |
|---|---|---|---|
| R1 = 0.2469 | D1 = 0.06 | N1 = 1.59538 | ν1 = 60.7 |
| R2 = −2.2838 | D2 = 0.14 | | |
| R3 = −0.2486 | D3 = 0.03 | N2 = 1.76359 | ν2 = 25.7 |
| R4 = −12.6866 | | | |

TABLE 2

| F = 1.0 | | FNO = 6.5 | |
|---|---|---|---|
| R1 = 0.2351 | D1 = 0.09 | N1 = 1.61049 | ν1 = 63.4 |
| R2 = −2.8120 | D2 = 0.12 | | |
| R3 = −0.2259 | D3 = 0.05 | N2 = 1.82234 | ν2 = 23.9 |
| R4 = −4.5216 | | | |

TABLE 3

| F = 1.0 | | FNO = 6.6 | |
|---|---|---|---|
| R1 = 0.2440 | D1 = 0.09 | N1 = 1.49225 | ν1 = 81.6 |
| R2 = −1.0764 | D2 = 0.13 | | |
| R3 = −0.2260 | D3 = 0.08 | N2 = 1.71032 | ν2 = 28.5 |
| R4 = −1.0788 | | | |

Figure 3:
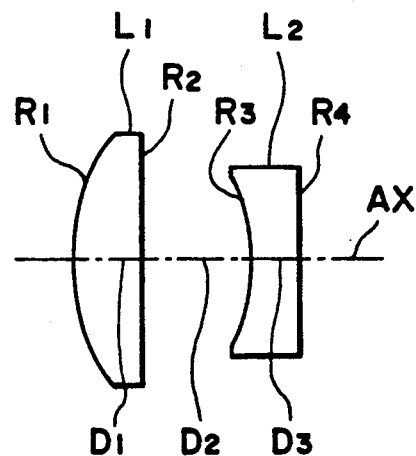
FIGS. 3 and 4 are respectively a sectional view of a lens and a view showing aberrations in a focusing optical system according to a second embodiment of the present invention.
Figure 2:
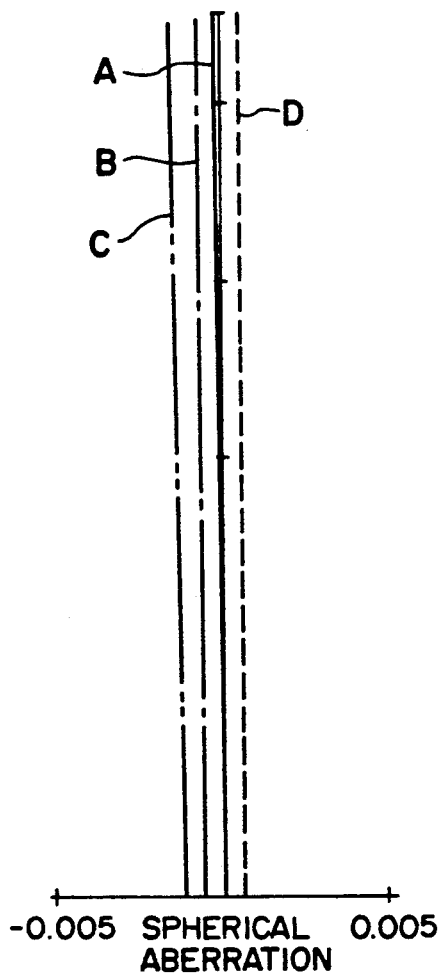
Figure 4:
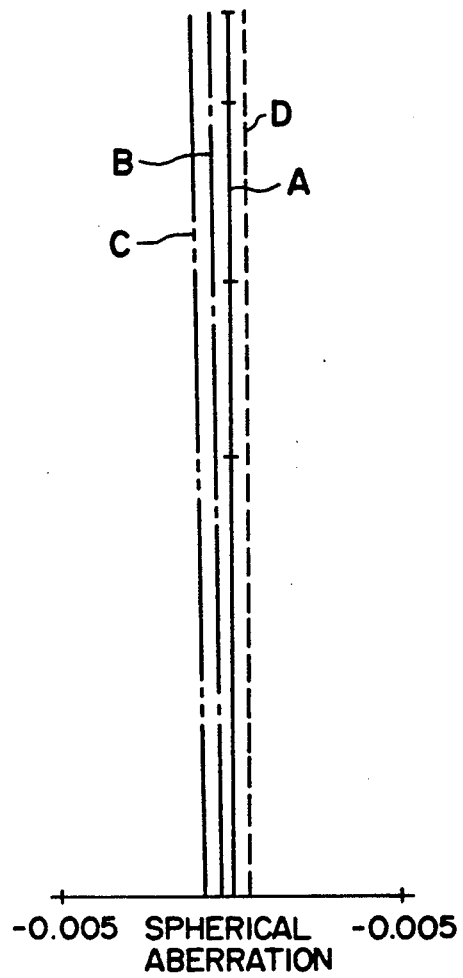
Figure 5:
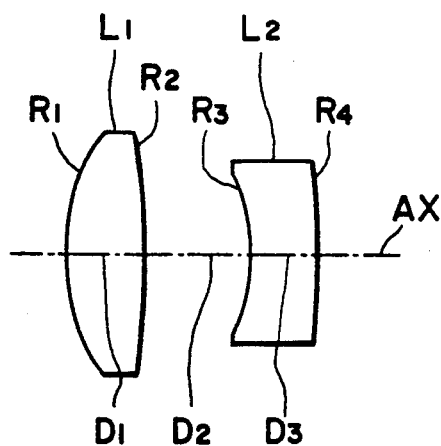
FIGS. 5 and 6 are respectively a sectional view of a lens and a view showing aberrations in a focusing optical system according to a third embodiment of the present invention.
Figure 6:
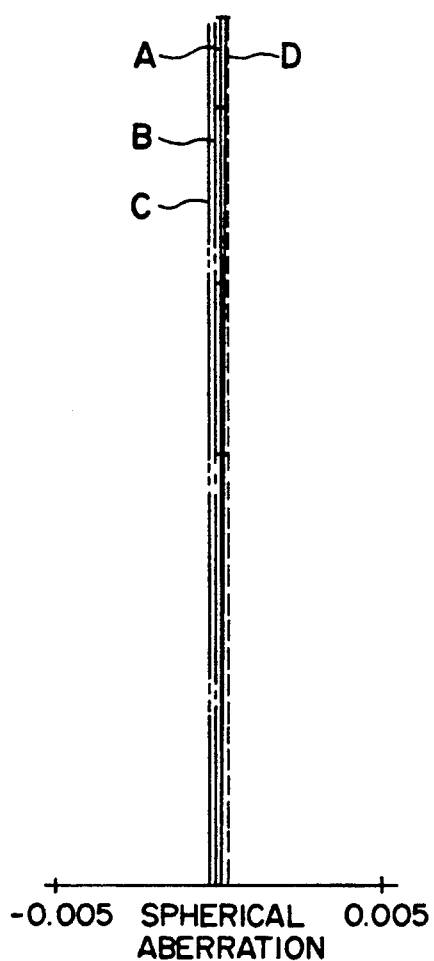

FIGS. 1, 3, and 5 are sectional views of lenses of the focusing optical systems of the embodiments shown in Tables 1 to 3. FIGS. 2, 4, and 6 show spherical aberrations with respect to a plurality of wavelengths of the focusing optical systems shown in FIGS. 1, 3, and 5, respectively.

In the sectional view of the lenses, $L_1$ represents a first lens group having a positive refracting power, $L_2$ represents a second lens group having a negative refracting power, and AX represents an optical axis. In addition, Ri (i=1, 2, 3, 4) and Di (i=1, 2, 3) are symbols corresponding to the above-mentioned lens data.

According to the focusing optical system of this embodiment, the first lens group $L_1$ comprises a single convex lens, and is arranged at the side of the surface of a medium (not shown). The second lens group $L_2$ comprises a single concave lens, and is arranged at the side of a photodetector (not shown).

In this embodiment, each of the lens groups $L_1$ and $L_2$ respectively comprises a single lens, but may comprise a plurality of lenses. However, if each lens group comprises a single lens like in this embodiment, assembly and adjustment can be facilitated, and cost can be reduced, resulting in practical advantages.

In FIGS. 2, 4, and 6, A represents a spherical aberration curve with respect to a wavelength of 820 nm, B represents a spherical aberration curve with respect to a wavelength of 800 nm, C represents a spherical aberration curve with respect to a wavelength of 780 nm, and D represents a spherical aberration curve with respect to a wavelength of 840 nm.

As can be seen from FIGS. 2, 4, and 6, according to the present invention, a focusing optical system, in which the on-axis or axial chromatic aberration is satisfactorily corrected, can be provided. Therefore, even if variations in wavelength of the light source occurs, variations in aberration in the optical system can be minimized.

Figure 7:
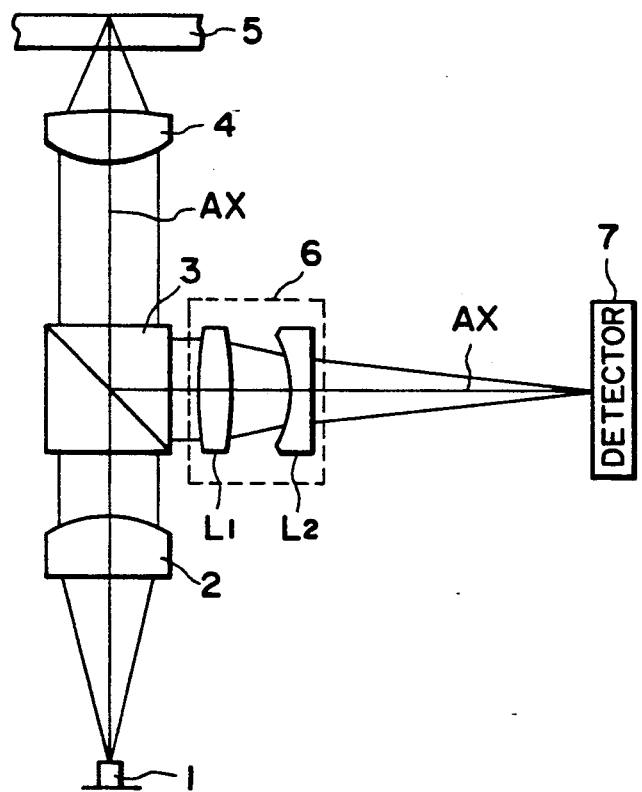
FIG. 7 is a schematic view showing an information recording/reproducing apparatus having the focusing optical system of the present invention.

FIG. 7 is a schematic view of an optical information recording/reproducing apparatus comprising the focusing optical system of the present invention.

The information recording/reproducing apparatus shown in FIG. 7 includes a semiconductor laser 1, a collimator lens 2, a beam splitter 3, an objective lens 4, an information recording medium (e.g., optical disk) 5, a condensing or focusing lens 6, and a photodetector 7.

The focusing lens 6 comprises a lens system shown in any one of FIGS. 1, 3, and 5. The chromatic aberration of the focusing lens 6 is corrected as well as various aberrations within the range of a change in oscillation wavelength of the laser 1.

The objective lens 4 shown in FIG. 7 comprises a single aspherical lens. The lens 4 may employ an optical system disclosed in U.S. Ser. No. 677,091, now U.S. Pat. No. 4,828,373, or Ser. No. 829,966, now U.S. Pat. No. 4,729,645, or U.S. Pat. No. 4,657,352 (the same assignee as this application). These optical systems comprise an objective lens having one aspherical surface. However, an optical system comprising a double-aspherical surface lens or a plurality of lens elements may be employed. Not only a uniform medium optical system but also a so-called "gradient index lens" having a refracting index distribution in the medium can be used.

A divergent laser beam emitted from the semiconductor laser 1 is collimated to a parallel laser beam by the collimator lens 2, and is then directed toward the beam splitter 3.

The parallel laser beam passing through the beam splitter 3 is incident on the objective lens 4, and is thereby converted to a convergent laser beam. Then, the convergent laser beam is focused on the information recording surface of the information recording medium 5.

The laser beam reflected by the information recording surface of the information recording medium 5 is directed toward the beam splitter 3 through the objective lens 4, and is then reflected by the beam splitter 3.

The laser beam reflected by the beam splitter 3 is focused on the photodetector 7 through the focusing optical system 6.

The focusing optical system 6 comprises two lenses. Since the chromatic aberration is corrected well, as described above, even if the oscillation wavelength of the semiconductor laser 1 is changed, the focusing optical system 6 can always focus the laser beam reflected by the information recording medium 5 onto the photodetector 7 in the best state.

Therefore, a focusing error signal or a tracking signal output from the photodetector 7 in accordance with the incident state of the reflected laser beam onto the photodetector 7 is always accurate and stable. For this reason, reliability of a recording/reproducing system can be greatly improved, and information recording/reproduction can be accurately performed.

As a method of detecting the focusing error signal or the tracking signal, various known methods are employed. The objective lens 4 is moved along the optical axis AX and in a direction perpendicular to the optical axis AX based on these signals. Drive control of the objective lens 4 is performed by an objective lens drive mechanism (not shown), so that the laser beam is accurately focused on the surface of the information recording medium, and a laser beam spot is accurately formed on a predetermined track on the surface of the information recording medium. Such AF servo and AT servo are executed by a servo system of a control apparatus (not shown). The servo system is operated upon reception of the output signals from the photodetector 7.

When information is to be recorded on a track of the recording surface of the information recording medium 5, a driver (not shown) of the semiconductor laser 1 is controlled in accordance with the signal corresponding to information to be recorded, such that the laser beam emitted from the semiconductor laser 1 is turned on or off to form information bits along the track. In this case, the information recording medium 5 is moved (rotated) in a direction along the track. In addition, AF and AT are performed for the recording surface.

When information recorded on the recording surface of the information recording medium is to be reproduced, the laser beam having a lower intensity than that in the recording mode is emitted from the semiconductor laser 1, and the beam reflected by the bits of the track on the recording surface is detected by the photodetector 7 through the objective lens 4, the beam splitter 3, and the focusing optical system 6. The photodetector 7 outputs a signal corresponding to the recorded information. In this case, the information recording medium 5 is also moved (rotated) in a direction along the track. In addition, AF and AT are performed.

According to the present invention, since the recording and reproducing operations described above are performed in accordance with the accurate output signal from the photodetector 7, a highly reliable, high-performance optical information recording/reproducing apparatus can be provided.

In the apparatus shown in FIG. 7, the objective lens 4 may comprise an achromatic lens which is subjected to chromatic-aberration correction within substantially the same wavelength range as the focusing optical system 6. In this case, the objective lens 4 may comprise a composite single lens disclosed in Japanese Patent Laid-Open No. 3110/1986, so that the objective lens 4 can be rendered compact and light in weight. Therefore, a load for a drive mechanism of the objective lens 4 can be reduced, and high-speed AF and AT can be realized. Since both the objective lens 4 and the focusing optical system 6 are subjected to chromatic-aberration correction, a system which is resistant and stable against variations in wavelength of the light source can be constructed.

The collimator lens 2 normally comprises an optical system consisting of a few spherical lenses or an aspherical lens or gradient index lens similarly to the objective lens 4.

An achromatic optical system combining the collimator lens 2 and the objective lens 4 may be provided. With this system, the objective lens 4 need not comprise a complex optical system such as a composite lens. Of course, also in this case, a system which is resistant to variations in wavelength of the light source can be constructed in cooperation with the effect of the focusing optical system mentioned above.

The typical embodiments of the present invention have been described in detail. It is deemed easy to those skilled in the art to design various focusing optical systems based on the principle of the present invention. Therefore, the present invention is not limited to the embodiments described above, and can provide various other focusing optical systems and optical information recording/reproducing apparatuses.

The focusing optical system according to the present invention is an optical system, in which the aberrations are corrected with respect to a plurality of wavelengths. For this reason, light from a surface of the information recording medium can always be satisfactorily focused on the photodetector regardless of variations in wavelength of the light source.

Therefore, an optical information recording/reproducing apparatus which is free from an influence of variations in wavelength of the light source can be provided, and highly accurate servo control such as AF and AT can be performed in the recording/reproducing mode.

What is claimed is:

1. An optical information recording/reproducing apparatus comprising:
   means for directing a radiation beam to a recording medium, wherein said directing means includes a collimator lens for forming a parallel beam, an objective lens for receiving the parallel beam to focus it on the recording medium and a beam splitter disposed in a path of the parallel beam between said collimator lens and said objective lens; and
   means for detecting a beam from the recording medium, said means including a photodetector means and a condensing optical system for condensing the beam from the recording medium onto said photodetector means, and said condensing optical system is so arranged as to receive a beam reflected by the recording medium, and made generally parallel by said objective lens through said beam splitter said condensing optical system including a first lens group and a second lens group, said first lens group having a positive refracting power $\psi_p$, where $\psi_p = 1/(f_p/F) = F/f_p$ and $f_p$ is a focal length of a first group positive lens, and being arranged at a side of the recording medium and said second lens group having a negative refracting power $\psi_n$, where $\psi_n = 1/(f_n/F) = F/f_n$ and fn is a focal length of a second group negative lens, and being arranged at a side of said photodetector means, wherein the following relation is met:

$$-0.15F < \frac{\psi_p}{\nu_p} + \left[\frac{\psi_p}{\nu_p}\right]\frac{\psi_n}{\nu_n} < 0$$

where F is a focal length of said condensing optical system, $\nu_p$ is Abbe's number of said first lens group and $\nu_n$ is Abbe's number of said second lens group.

2. An apparatus according to claim 1, wherein said photodetector means generates at least one of a signal for indicating a focus error of the radiation beam, relative to the recording medium, and a signal for indicating a tracking error of the radiation beam, relative to the recording medium, responsive to the beam condensed thereon by said condensing optical system.

3. An apparatus according to claim 2, wherein said directing means includes a semiconductor laser and directs a radiation beam from said laser to the recording medium, and the following relation is met:

$$\nu_p > 60, \nu_n < 35.$$

4. An apparatus according to claim 2, wherein said first and second lens group respectively consist of a single lens element.

5. An optical information recording/reproducing apparatus comprising:
   a semiconductor laser;
   means for directing a laser beam from said laser onto a recording medium, said means including a collimating lens for collimating the laser beam from said laser and an objective lens for focusing a beam from said collimating lens on the recording medium; and
   means for detecting a beam reflected by the recording medium through said objective lens, said detecting means including a condensing optical system and a photodetector means, said condensing optical system condensing the reflected beam onto said photodetector means, said photodetector means generating at least one of a focusing error signal, for indicating a focus error of the laser beam relative to the recording medium and a tracking error signal, for indicating a tracking error of the laser beam relative to the recording medium, and said condensing optical system including a first lens group and a second lens group, said first lens group having a positive refracting power $\psi_p$ and being arranged at a side of said photodetector means, where $\psi_p = 1/(f_p/F) = F/f_p$, and fp is a focal length of a first group positive lens, and the following relation is met:

$$-0.15 < \frac{\psi_p}{\nu_p} + \frac{\psi_n}{\nu_n} < 0, \nu_p > 60, \nu_n < 35$$

where F is a focal length of said condensing optical system and $\psi_n$ is the negative refracting power, and $\psi_n = 1/(f_n/F) = F/f_n$, where fn is a focal length of a second group negative lens, and $\nu_p$ is Abbe's number of said first lens group and $\nu_n$ is Abbe's number of said second lens group.

6. An apparatus according to claim 5, wherein said objective lens is an achromatic lens.

7. An apparatus according to claim 5, wherein a focal length of said condensing optical system is larger than that of said objective lens.

8. An apparatus according to claim 5, wherein said directing means includes a beam splitter disposed between said collimating lens and said objective lens, and said detecting means detects the reflected beam through said beam splitter.

9. An apparatus according to claim 5, wherein said first and second lens group respectively each consist of a single lens element.

10. An optical information recording and/or reproducing apparatus comprising:
   a light source;
   means for directing a light beam from said light source on to a recording medium, said means includes a first optical system for directing the light beam from said light source to a second optical system, said second optical system for focusing the light beam on the recording medium, and a beam splitter disposed between said first and second optical systems; and
   means for receiving a light beam from the recording medium via said second optical system and said beam splitter, said means including a photodetector means and a condensing optical system or condensing the beam from the recording medium onto said photodetector means, and said condensing optical system including a first lens group and a second lens group, said first lens group having a positive refracting power $\psi_p$ and being arranged at a side of the recording medium and said second lens group having a negative refracting power $\psi_n$ and being arranged at a side of said photodetector means, wherein the following relation is met:

$$-0.15F < \frac{\psi_p}{\nu_p} + \frac{\psi_n}{\nu_n} < 0$$

where F is a focal length of said condensing optical system, $\nu_p$ is Abbe's number of said first lens group and $\nu_n$ is Abbe's number of said second lens group.

11. An apparatus according to claim 10, wherein said photodetector means generates at least one of a signal for indicating a focus error of the radiation beam, relative to the recording medium, and a signal for indicating a tracking error of a radiation beam, relative to the recording medium, responsive to the beam condensed thereon by said condensing optical system.

12. An apparatus according to claim 11, wherein the following relation is met:

$\nu_p > 60, \nu_n < 35.$

13. An apparatus according to claim 11, wherein said first and second lens groups respectively consist of a single lens element.

* * * * *

UNITED STATES PATENT AND TRADEMARK OFFICE
CERTIFICATE OF CORRECTION

PATENT NO. : 5,202,867

DATED : April 13, 1993

INVENTOR(S) : HIROSHI MATSUI, ET AL.

Page 1 of 2

It is certified that error appears in the above-identified patent and that said Letters Patent is hereby corrected as shown below:

IN THE ABSTRACT:

Items:   [56], "Matsui" should read --Matsui,--.
         [57], "esp." should read --especially--.

Column 3

Line 50, "$L = hp \frac{\Psi p}{\upsilon p} hn \frac{\Psi n}{\upsilon n}$" should read -- $L = hp \frac{\Psi p}{\upsilon p} + hn \frac{\Psi n}{\upsilon n}$ --.

Column 7

Line 61, "splitter" should read --splitter,--.

Column 8

Line 7, "$-0.15F < \frac{\Psi p}{\upsilon p} + \left[\frac{\Psi p}{\upsilon p}\right]\frac{\Psi n}{\upsilon n} < 0$"

should read -- $-0.15F < \frac{\Psi p}{\upsilon p} + \frac{\Psi n}{\upsilon n} < 0$ --.

Line 28, "group" should read --groups--.

UNITED STATES PATENT AND TRADEMARK OFFICE
CERTIFICATE OF CORRECTION

PATENT NO. : 5,202,867
DATED : April 13, 1993
INVENTOR(S) : HIROSHI MATSUI, ET AL.

It is certified that error appears in the above-identified patent and that said Letters Patent is hereby corrected as shown below:

<u>Column 9</u>

Line 12, "group" should read --groups--.
   Line 18, "on to" should read --onto--.
   Line 28, "or" should read --for--.

Signed and Sealed this

Twenty-second Day of March, 1994

Attest:

BRUCE LEHMAN

Attesting Officer      Commissioner of Patents and Trademarks